United States Patent
Yukisada et al.

(10) Patent No.: US 9,067,479 B2
(45) Date of Patent: Jun. 30, 2015

(54) ROLLER SHADE

(71) Applicant: Webasto SE, Stockdorf (DE)

(72) Inventors: Shinya Yukisada, Higashi-Hiroshima (JP); Akio Yamada, Higashi-Hiroshima (JP)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 14/127,397

(22) PCT Filed: Mar. 27, 2013

(86) PCT No.: PCT/EP2013/056597
§ 371 (c)(1),
(2) Date: Dec. 18, 2013

(87) PCT Pub. No.: WO2013/149917
PCT Pub. Date: Oct. 10, 2013

(65) Prior Publication Data
US 2014/0224436 A1    Aug. 14, 2014

(30) Foreign Application Priority Data
Apr. 4, 2012  (JP) .................. 2012-085898

(51) Int. Cl.
*B60J 7/06*    (2006.01)
*B60J 7/00*    (2006.01)
*E06B 9/42*    (2006.01)

(52) U.S. Cl.
CPC  *B60J 7/06* (2013.01); *B60J 7/0015* (2013.01); *E06B 9/42* (2013.01)

(58) Field of Classification Search
USPC .......................... 160/370.22, 273.1; 296/119
IPC ...................................................... B60J 7/0015
See application file for complete search history.

(56) References Cited

U.S. PATENT DOCUMENTS

| 1,882,982 | A  | * | 10/1932 | Schmiedeskamp | ........ 160/273.1 |
| 7,114,766 | B2 | * | 10/2006 | Becher et al. | ................. 296/214 |
| 7,114,767 | B2 | * | 10/2006 | Grimm et al. | ................. 296/214 |

(Continued)

FOREIGN PATENT DOCUMENTS

| DE | 202006015107 UI | 2/2007 |
| EP | 2272699 A1 | 1/2011 |

(Continued)

OTHER PUBLICATIONS

International Search Report in PCT/EP2013/056597, issued Jul. 26, 2013.

*Primary Examiner* — David Purol
(74) *Attorney, Agent, or Firm* — Fitch, Even, Tabin & Flannery LLP

(57) ABSTRACT

A roller shade includes a light shielding sheet which can be rolled up in a roll shape, a roller and an electric motor for openably moving the light shielding sheet, guide belts connected to respective lower surfaces of side end parts of the light shielding sheet in a sheet width direction, and a pair of guide parts each having a guide space which receives a corresponding one of the side end parts of the light shielding sheet in the sheet width direction and a corresponding one of the guide belts, for guiding the side end part and the guide belt. In the roller shade, the light shielding sheet is prevented from being creased when the light shielding sheet moves in the width direction while being rolled or unrolled, due to lack of a tension of the light shielding sheet in the width direction.

3 Claims, 5 Drawing Sheets

(56) References Cited

U.S. PATENT DOCUMENTS

| | | | |
|---|---|---|---|
| 7,950,440 B2 * | 5/2011 | Rockelmann et al. | 160/273.1 |
| 8,590,593 B2 | 11/2013 | Kitani et al. | |
| 2007/0175603 A1 * | 8/2007 | Lin | 160/273.1 |
| 2009/0145559 A1 * | 6/2009 | Glasl et al. | 160/273.1 |
| 2009/0178771 A1 * | 7/2009 | Lin | 160/370.22 |
| 2010/0326607 A1 | 12/2010 | Kitani et al. | |

FOREIGN PATENT DOCUMENTS

| | | |
|---|---|---|
| JP | 2001-180279 A | 7/2001 |
| JP | 2011-006011 A | 1/2011 |
| WO | 2005068236 A2 | 7/2005 |

* cited by examiner

ROLLER SHADE

CROSS REFERENCE TO RELATED APPLICATIONS

This application is a U.S. national phase application of International Application No. PCT/EP2013/056597, filed Mar. 27, 2013, which claims benefit of the priority date of Japan Application 2012-085898, filed Apr. 4, 2012, which are hereby incorporated herein by reference in their entirety.

TECHNICAL FIELD

The present disclosure relates to roller shades attached to a window formed in a roof of a vehicle.

As a roller shade of this type, a device that includes a light shielding sheet which can be rolled up in a roll shape and unrolled, a pair of guide belts each connected to a corresponding one of side ends of the light shielding sheet in a width direction, and a pair of guide parts each guiding a corresponding one of the side ends of the light shielding sheet in the width direction along with the guide belt, has been known (see, for example, Japanese Patent Publication No. 2011-6011). In this roller shade, the guide belt is configured such that one of its surfaces in a thickness direction forms an arc shape, i.e., a convex surface in a cross-sectional view taken along the width direction of the light shielding sheet. A middle portion of the convex surface of each guide belt in the width direction is connected to a corresponding one of the side ends of the light shielding sheet in the width direction. Edges of each guide belt in a sheet width direction are engaged with a pair of engagement portions of the guide part. The pair of engagement portions are connected to each other via a bottom wall portion located under the guide belt. An arc space surrounded by the engagement portions and the bottom wall portion forms a guide space.

SUMMARY OF INVENTION

In the above roller shade, the light shielding sheet may move in the width direction (in a direction orthogonal to the sheet moving direction) during rolling and unrolling the light shielding sheet, due to variations in dimensions of the light shielding sheet, inaccuracies in assembling the roller shade, etc. If this direction in which the light shielding sheet moves is, for example, a direction which makes the guide belt away from the inner side one of the engagement portions in the sheet width direction, the tension of the light shielding sheet in the width direction becomes insufficient. This may cause the light shielding sheet to become wrinkled, and the wrinkle may cause trouble in rolling up the light shielding sheet.

To avoid such a trouble, it is preferable to reduce the variations in dimensions of the light shielding sheet and inaccuracies in assembling the roller shade as much as possible. However, to achieve that, it is necessary to raise the inaccuracy control level in the assembly step, or increase fabrication accuracy of each component (such as the light shielding sheet and the guide part), and there are limitations in terms of the number of assembly steps and cost.

The present disclosure is thus intended to provide a roller shade which can prevent a reduction in tension of the light shielding sheet in the width direction even if the light shielding sheet moves in the width direction in a rolling/unrolling movement, in a simple structure at low cost.

The first aspect of the present disclosure is directed to a roller shade, including: a light shielding sheet which can be rolled up in a roll shape or can be unrolled and which covers a window formed in a roof of a vehicle so as to open/close the window; rolling means configured to move the light shielding sheet in an opening direction of the window by rolling up the light shielding sheet and move the light shielding sheet in a closing direction of the window by unrolling the light shielding sheet; a pair of strip-shaped guide belts each extending along a corresponding one of side end parts of the light shielding sheet in a sheet width direction perpendicular to a traveling direction of the light shielding sheet and each connected to a lower surface of the light shielding sheet; and a pair of guide parts each having a guide space which receives a corresponding one of the side end parts of the light shielding sheet in the sheet width direction and a corresponding one of the guide belts, for guiding the side end part and the guide belt in the traveling direction.

Each guide belt tilts downward from a base end which is a connection part of the guide belt with the light shielding sheet, toward an inner side in the sheet width direction, and is vertically flexible about the connection part as a point of support, and an inner wall surface of the guide space includes an inclined surface part which is located near the guide belt and closer to the inner side in the sheet width direction than the guide belt, and which extends upward to tilt to an outer side in the sheet width direction.

According to the first aspect of the present disclosure, if the light shielding sheet moves in a direction in which the guide belt approaches the inclined surface part of the guide part due to variations in dimensions of the light shielding sheet or inaccuracies in assembling the roller shade, the inner end part of the guide belt in the sheet width direction comes in contact with the inclined surface part, thereby preventing the guide belt from protruding out of the guide space.

Here, the guide belt is configured to be vertically flexible about the connection part of the guide belt with the light shielding sheet, as a point of support. Thus, in the state in which an inner end part of the guide belt in the sheet width direction contacts the inclined surface part, the inner end part of the guide belt in the sheet width direction slides downward along the inclined surface part as the guide belt moves toward the inclined surface part (toward the inner side in the sheet width direction), and the guide belt warps downward about the connection part with the light shielding sheet. As a result, a load acting on the light shielding sheet in the sheet width direction can be diverted and relieved, and therefore excessive tension in the sheet width direction can be prevented from acting on the light shielding sheet.

If the guide belt moves toward an outer side in the sheet width direction, that is, away from the inclined surface part, in a state in which the guide belt is warped downward about the connection part as a point of support due to contact between the inner end part of the guide belt in the sheet width direction and the inclined surface part, the inner end part of the guide belt in the sheet width direction slides upward along the inclined surface part in an inclination direction thereof, and an inclination angle of the guide belt with respect to the light shielding sheet is decreased by restoring force of the guide belt.

Thus, even when the light shielding sheet moves such that the guide belt is apart from the inclined surface part, tension in the sheet width direction can be constantly provided to the light shielding sheet by the restoring force of the guide belt. As a result, it is possible to reduce wrinkling of the light shielding sheet due to significant reduction in tension of the light shielding sheet in the sheet width direction or winding failure of the light shielding sheet due to the wrinkling of the light shielding sheet.

The second aspect of the present disclosure is that in the first aspect of the present disclosure, if the light shielding sheet moves, in a direction in which each guide belt is apart from the inclined surface part, in a state in which the each guide belt downwardly warps about the point of support which is the connection part due to contact between an inner end part of the each guide belt in the sheet width direction and the inclined surface part, the inner end part of the each guide belt in the sheet width direction upwardly slides along the inclined surface part in an inclination direction thereof while an inclination angle of the each guide belt with respect to the light shielding sheet is decreased by restoring force of the each guide belt which warps, thereby providing tension in the sheet width direction to the light shielding sheet.

According to the second aspect of the present disclosure, advantages similar to the advantages according to the first aspect can be reliably obtained.

The third aspect of the present disclosure is that in the first or second aspect of the present disclosure, a vertical length of the guide space on the outer side in the sheet width direction is shorter than a vertical length of the guide space on the inner side in the sheet width direction.

According to the third aspect of the present disclosure, a vertical length of the guide space is shorter on the outer side in the sheet width direction than the inner side in the sheet width direction. Thus, in the state in which the inner end part of the guide belt in the sheet width direction is apart from the inclined surface part, the guide belt is not guided by the inclined surface part, but instead, the end part of the light shielding sheet in the sheet width direction, together with the guide belt, can be securely guided by the guide space on the outer side in the sheet width direction where the vertical length is short. Thus, the light shielding sheet can be guided with reliability.

On the other hand, the vertical length of the guide space on the inner side in the sheet width direction is larger than the vertical length of the guide space on the outer side. Thus, in the state in which the inner end part of the guide belt in the sheet width direction contacts the inclined surface part, the inclination angle of the guide belt with respect to the light shielding sheet is large, and therefore sufficient height at which the guide belt is caught by the inclined surface part can be ensured. As a result, it is possible to reliably prevent the guide belt from protruding out of the guide space.

The fourth aspect of the present disclosure is that in the third aspect of the present disclosure, a part of a lower surface of the guide space on the outer side in the sheet width direction is positioned higher than a part of the lower surface of the guide space on the inner side in the sheet width direction.

According to the fourth aspect of the present disclosure, in the state in which the guide belt is significantly apart from the inclined surface part, the end part of the light shielding sheet in the sheet width direction, together with the guide belt, can be supported as high as possible by the lower surface of the guide space. This can reduce weighing-down of the end part of the light shielding sheet in the sheet width direction, and therefore, it is possible to prevent deformation of the light shielding sheet, and degradation of appearance of the light shielding sheet.

ADVANTAGES OF INVENTION

As described above, according to the roller shade of the present disclosure, the guide belt is configured to tilt downward from a base end which is a connection part of the guide belt with the light shielding sheet, toward an inner side in the sheet width direction, and to be vertically flexible about the connection part as a point of support. Further, an inner wall surface of the guide space includes an inclined surface part which is located near the guide belt and closer to the inner side in the sheet width direction than the guide belt, and which extends upward to tilt to the outer side in the sheet width direction. With this structure, even when the light shielding sheet moves in the sheet width direction, wrinkling of the light shielding sheet due to reduction in tension of the light shielding sheet in the sheet width direction or winding failure of the light shielding sheet due to the wrinkling of the light shielding sheet can be prevented with reliability.

BRIEF DESCRIPTION OF THE DRAWINGS

FIG. 5(a) illustrates the case where the upper surface of the lower wall part defines a flat surface. FIG. 5(b) illustrates the case where the upper surface of the lower wall part defines a step-shaped surface.

DESCRIPTION OF EMBODIMENTS

An embodiment of the present disclosure will be described below in detail with reference to drawings.

Figure 1:
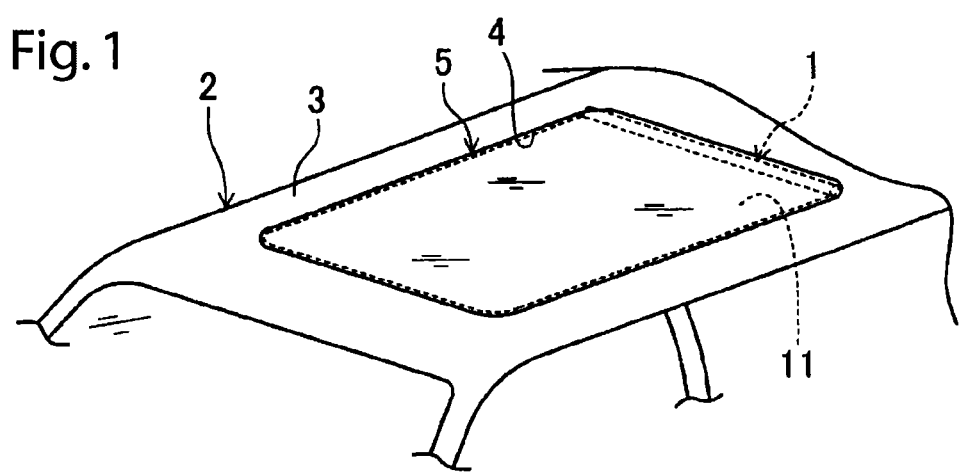
FIG. 1 is a diagonal perspective view from a front left side of a vehicle, and illustrates a vehicle roof in which a roller shade of an embodiment of the present disclosure is provided.

FIG. 1 illustrates a vehicle roof part 2 to which a roller shade 1 of an embodiment of the present disclosure is attached. A window 5 formed by fitting a glass panel in a substantially-rectangular opening 4 is formed in a roof panel 3 of the vehicle roof part 2. The window 5 functions as a light transmission part through which sunlight enters a vehicle compartment. In the description below, a "front" and a "rear" means a front side and a rear side of a vehicle, respectively.

The roller shade 1 is an electric roller shade driven by an electric motor. The roller shade 1 is arranged below the window 5, and includes a light shielding sheet 11 which can be rolled up in a roll or can be unrolled. The roller shade 1 is configured to block direct sunlight in such a manner that the window 5 is covered by the unrolled light shielding sheet 11.

Figure 2:
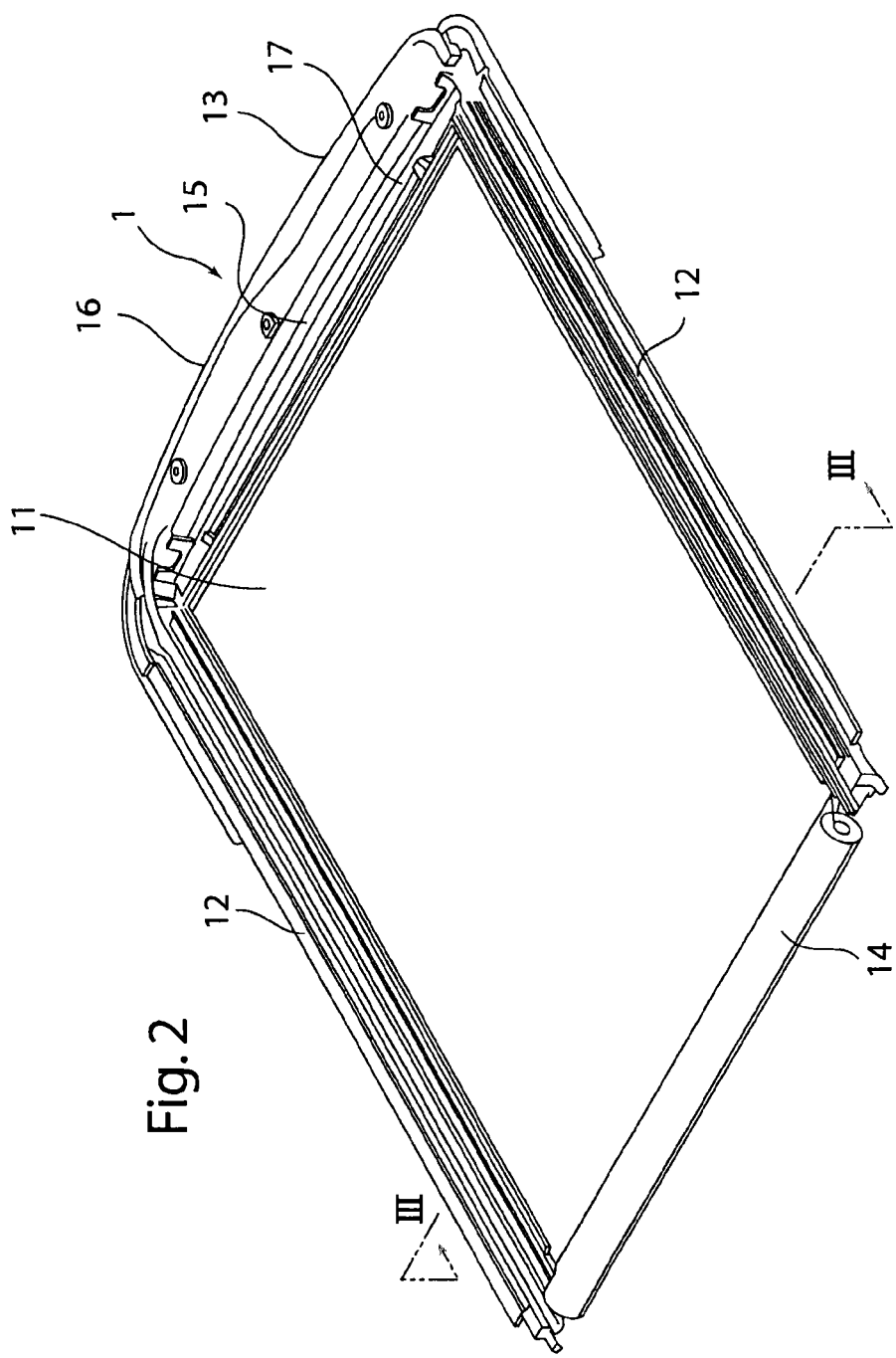
FIG. 2 is a diagonal perspective view from an upper right rear side of the vehicle, and illustrates the roller shade.

Referring to FIG. 2, the roller shade 1 includes a pair of guide frames 12 each made of aluminum and extending in a front-back direction along a corresponding one of side end parts of the window 5 in a vehicle width direction, a resin frame 13 connecting front end parts of the guide frames 12 together, and a roller 14 supported, at end parts thereof in a shaft direction, by rear end parts of the guide frames 12.

The resin frame 13 is in a U-shape in which the resin frame 13 opens at the rear as viewed in the plane. An electric motor (not shown in the figure) and a drive gear 15 driven by the electric motor are attached to a middle part of the resin frame 13 in the vehicle width direction. A geared cable 16 having an outer peripheral surface at which a gear part is formed is engaged with the drive gear 15.

The light shielding sheet 11 is wound around the roller 14 so as to be rolled up or unrolled. An end of the light shielding sheet 11 on an unrolled side on which the light shielding sheet 11 is unrolled is a free end, and an end of the light shielding sheet 11 opposite to the unrolled side is a fixed end fixed to the roller 14. A garnish 17 extending in the vehicle width direction along the end of the light shielding sheet 11 on the unrolled side is connected to the end of the light shielding sheet 11 on the unrolled side. A runner part (not shown in the figure) which is slidable back and forth is provided along the guide frame 12 in each of end parts of the garnish 17 in the vehicle width direction. The runner parts are connected to the geared cable 16. When the motor rotates, the geared cable 16 is driven by the drive gear 15 to move the runner parts back and forth. While the runner parts move back and forth, the light shielding sheet 11 also moves, together with the runner parts (garnish 17), in the front-back direction so as to open/close the window 5.

The light shielding sheet 11 is constantly biased toward a roll-up side by a biasing mechanism built in the roller 14. In the present embodiment, when the light shielding sheet 11 is wound around the roller 14, the light shielding sheet 11 moves in an opening direction (i.e., toward the rear). When the light shielding sheet 11 is unrolled from the roller 14, the light shielding sheet 11 moves in a closing direction (i.e., toward the front). The direction perpendicular to the traveling direction of the light shielding sheet 11 is coincident with a width direction of the light shielding sheet 11 and the vehicle width direction.

Figure 3:
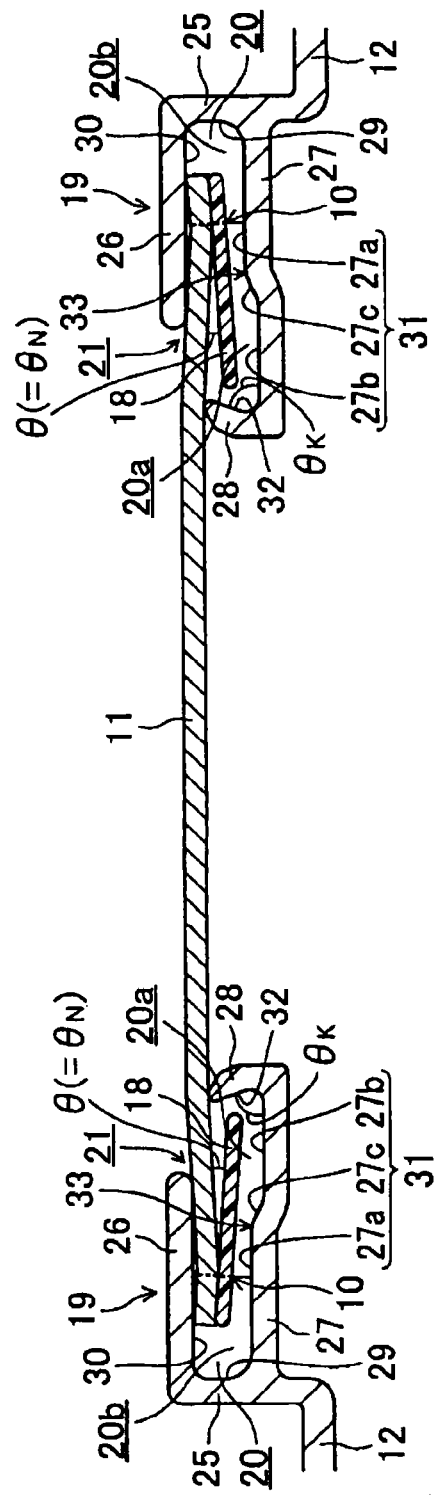
FIG. 3 is a cross-sectional view along an III-III line illustrated in FIG. 2.

Referring to FIG. 3, a strip-shaped guide belt 18 extending along each of side end parts of the light shielding sheet 11 in the width direction thereof is connected to a lower surface of the side end part of the light shielding sheet 11. The guide belt 18 is made of a resin material in the present embodiment, but the present disclosure is not limited to such a material. For example, the guide belt 18 may be made of an elastic material such as rubber. The guide belt 18 and the light shielding sheet 11 are connected together by sewing, and a sewing line extends straight along each of the side end parts of the light shielding sheet 11 in the width direction thereof.

The guide belt 18 downwardly tilts from a base end, i.e., a connection part 10 (sewing part) with the light shielding sheet 11, toward an inner side in the sheet width direction, and is vertically flexible about a point of support, i.e., the connection part 10. In the state (see FIG. 3) in which no external force acts on the guide belt 18, an inclination angle θ of the guide belt 18 with respect to the light shielding sheet 11 is a predetermined neutral angle $\theta_N$ (<90°). When external force acts on the guide belt 18 such that the inclination angle θ of the guide belt 18 with respect to the light shielding sheet 11 is less than the neutral angle $\theta_N$, restoring force in a direction (downward direction) in which the inclination angle θ is increased acts on the guide belt 18. When external force acts on the guide belt 18 such that the inclination angle θ is greater than the neutral angle $\theta_N$, restoring force in a direction (upward direction) in which the inclination angle θ is decreased acts on the guide belt 18. The neutral angle $\theta_N$ is an angle determined depending on, e.g., materials of the light shielding sheet 11, the guide belt 18, and a thread for sewing.

A guide part 19 extending in the front-back direction is formed in each of end parts of the guide frame 12 on an inner side in the vehicle width direction. In the guide part 19, a guide space 20 is formed, in which each of the side end parts of the light shielding sheet 11 in the width direction thereof is, together with the guide belt 18, accommodated and is guided so as to move in the front-back direction.

Referring to FIGS. 3-5, the guide part 19 includes a vertically-extending upstanding wall part 25 positioned on an outer side in the sheet width direction relative to the side end part of the light shielding sheet 11 in the width direction thereof, an upper wall part 26 inwardly extending in the sheet width direction from an upper end part of the upstanding wall part 25, a lower wall part 27 inwardly extending in the sheet width direction from a lower end part of the upstanding wall part 25, and a protruding wall part 28 upwardly protruding from an inner end part of the lower wall part 27 in the sheet width direction.

The upper wall part 26 extends in the front-back direction so as to cover an upper part of the side end part of the light shielding sheet 11 in the width direction thereof, and the lower wall part 27 extends in the front-back direction so as to cover a lower part of the guide belt 18 in the state in which the lower wall part 27 faces the upper wall part 26. The protruding wall part 28 is positioned below the light shielding sheet 11 on the inner side in the sheet width direction relative to the guide belt 18. An insertion hole 21 through which the light shielding sheet 11 is inserted is formed between an inner end part of the upper wall part 26 in the sheet width direction and an upper end part of the protruding wall part 28.

The guide space 20 is formed so as to be surrounded by the wall parts 25-28. A vertical distance between the upper wall part 26 and the lower wall part 27 is smaller on the outer side in the sheet width direction than on the inner side in the sheet width direction, and therefore the vertical length of the guide space 20 is smaller on the outer side in the sheet width direction than on the inner side in the sheet width direction. Specifically, the guide space 20 includes an inner guide space 20a positioned adjacent to the protruding wall part 28 on the inner side in the sheet width direction, and an outer guide space 20b positioned adjacent to the upstanding wall part 25 on the outer side in the sheet width direction. The vertical length $H_b$ (see FIG. 5(b)) of the outer guide space 20b is smaller than the vertical length $H_a$ of the inner guide space 20a.

An inner wall surface in the guide space 20 includes a horizontal surface part 30 defining a lower surface of the upper wall part 26, a vertical surface part 29 defining a surface of the upstanding wall part 25 on the inner side in the sheet width direction, a step-shaped surface part 31 having double steps and defining an upper surface of the lower wall part 27, and an inclined surface part 32 defining a surface of the protruding wall part 28 on the outer side in the sheet width direction.

The step-shaped surface part 31 defining the upper surface of the lower wall part 27 includes an outer horizontal surface 27a positioned adjacent to the upstanding wall part 25, and an inner horizontal surface 27b positioned on the inner side in the sheet width direction relative to the outer horizontal surface 27a. The outer horizontal surface 27a is positioned higher than the inner horizontal surface 27b. An inner end part of the outer horizontal surface 27a in the sheet width direction and an outer end part of the inner horizontal surface 27b in the sheet width direction are connected together through a connection surface 27c. The connection surface 27c downwardly tilts to the inner side in the sheet width direction.

The inclined surface part 32 is positioned adjacent to the guide belt 18 on the inner side in the sheet width direction, and upwardly tilts to the outer side in the sheet width direction. The inclination angle $\theta_K$ of the inclined surface part 32 with respect to the inner horizontal surface 27b is greater than the neutral angle $\theta_N$ which is the inclination angle of the guide belt 18 in a neutral state.

Next, a function to guide the light shielding sheet 11 and the guide belt 18 in the guide space 20 will be described with reference to FIGS. 4(a)-4(c).

Figure 4A:
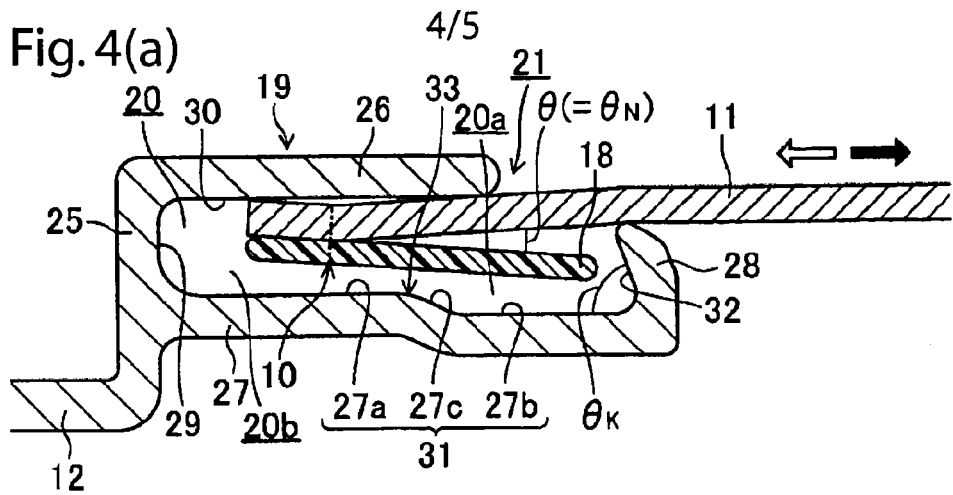
FIGS. 4(a)-4(c) are views illustrating a change in inclination angle of a guide belt when a light shielding sheet moves in a direction in which the guide belt approaches an inclined surface part or is apart from the inclined surface part.
Figure 5A:
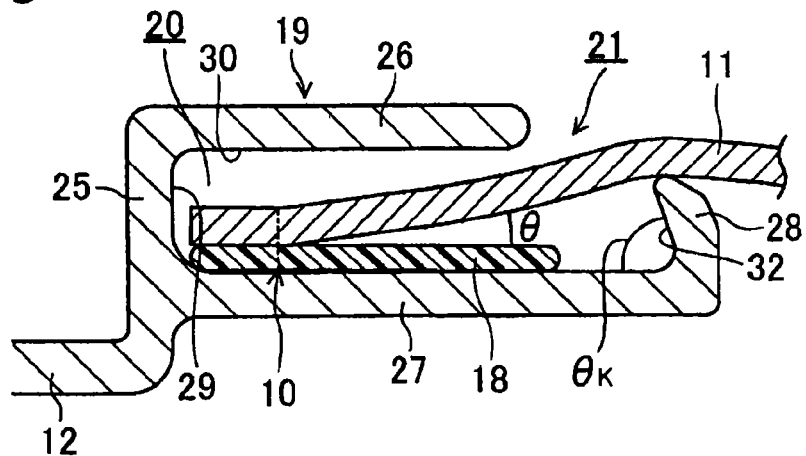
FIGS. 5(a) and 5(b) are views illustrating an advantage of forming a step-shaped upper surface of a lower wall part.

FIG. 4(a) illustrates the state in which there is a predetermined clearance between an inner end part of the guide belt 18 and the inclined surface part 32 of the protruding wall part 28. In such a state, the light shielding sheet 11 is guided with part of an upper surface of the light shielding sheet 11 contacting the upper wall part 26, and is guided with a lower surface of the light shielding sheet 11 contacting the upper end part of the protruding wall part 28.

Figure 4B:
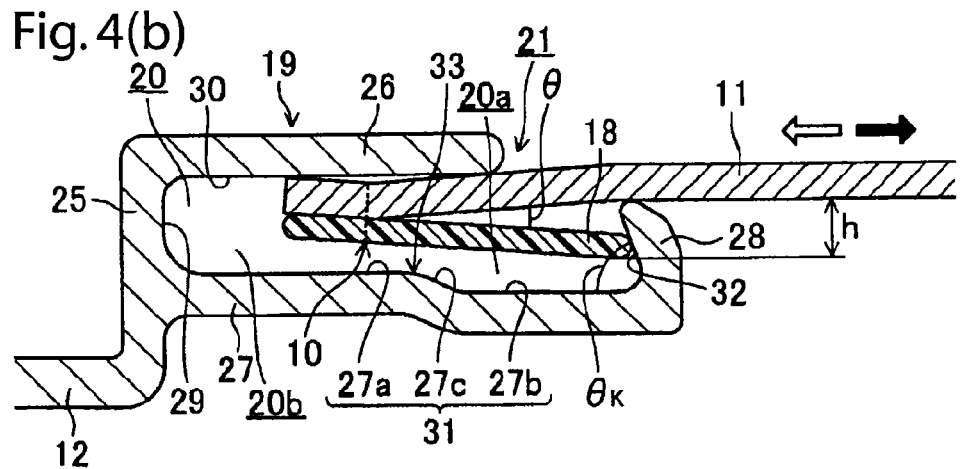
Figure 4C:
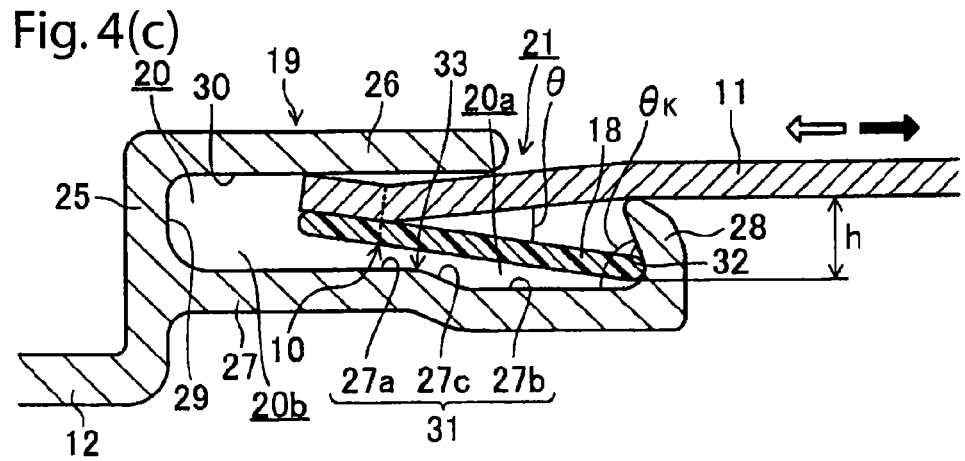

Suppose that, while the light shielding sheet 11 moves to open/close the window 5, the light shielding sheet 11 moves in a direction in which the guide belt 18 approaches the inclined surface part 32 (i.e., in a direction indicated by a black arrow in FIGS. 4(a)-4(c)). The distance between the inner end part of the guide belt 18 in the sheet width direction and the inclined surface part 32 of the protruding wall part 28 is gradually shortened, and the inner end part of the guide belt 18 eventually comes into contact with the inclined surface part 32 (see FIG. 4(b)). Then, when the light shielding sheet 11 further moves from the foregoing state in the direction indicated by the thick arrow, the inner end part of the guide belt 18 in the sheet width direction downwardly slides along the inclined surface part 32 in an inclination direction thereof. As a result, the guide belt 18 downwardly warps about the point of support, i.e., the connection part 10 of the guide belt 18 with the light shielding sheet 11. Consequently, the inclination angle (open angle) of the guide belt 18 with respect to the light shielding sheet 11 is increased. Thus, in such a manner that the guide belt 18 downwardly warps, a load acting on the light shielding sheet 11 in the sheet width direction can be diverted and relieved, and therefore excessive tension in the sheet width direction can be prevented from acting on the light shielding sheet 11. As the guide belt 18 approaches the inclined surface part 32, the height h at which the guide belt 18 is caught by the protruding wall part 28 is increased. Thus, it can be ensured that the guide belt 18 is prevented from protruding out of the guide space 20 through the insertion hole 21 (see FIG. 4(c)).

On the other hand, if the light shielding sheet 11 moves in a direction in which the guide belt 18 is apart from the inclined surface part 32, an inverse process is performed. That is, referring to the state illustrated in FIG. 4(c), the guide belt 18 downwardly warps about the point of support, i.e., the connection part 10 of the guide belt 18 with the light shielding sheet 11 in such a manner that the inner end part of the guide belt 18 in the sheet width direction contacts with the inclined surface part 32. When the light shielding sheet 11 further moves from the foregoing state in the direction in which the guide belt 18 is apart from the inclined surface part 32 (i.e., in a direction indicated by a white arrow in FIGS. 4(a)-4(c)), the inner end part of the guide belt 18 in the sheet width direction upwardly slides, referring to FIG. 4(b), along the inclined surface part 32 in the inclination direction thereof, and the inclination angle θ with respect to the light shielding sheet 11 is decreased by restoring force of the guide belt 18. Thus, even when the light shielding sheet 11 moves such that the guide belt 18 is apart from the inclined surface part 32, tension in the sheet width direction can be constantly provided to the light shielding sheet 11 by using restoring force of the guide belt 18. Consequently, wrinkling of the light shielding sheet 11 due to significant reduction in tension of the light shielding sheet 11 in the sheet width direction or winding failure of the light shielding sheet 11 due to the wrinkling of the light shielding sheet 11 can be reduced or prevented.

When the light shielding sheet 11 further moves from the state illustrated in FIG. 4(b) in the direction indicated by the white arrow, the inner end part of the guide belt 18 in the sheet width direction is completely apart from the inclined surface part 32, resulting in the state illustrated in FIG. 4(a).

If the distance between the inner end part of the guide belt 18 and the inclined surface part 32 is large, the end part of the light shielding sheet 11 in the width direction thereof is likely to be weighed down with the light shielding sheet 11 itself about a point of support, i.e., part near the contact part of the light shielding sheet 11 and the protruding wall part 28. Thus, if the upper surface of the lower wall part 27 defines a horizontal surface with no step as illustrated in, e.g., FIG. 5(a), the light shielding sheet 11 is upwardly raised at the part near the contact part of the light shielding sheet 11 and the protruding wall part 28 as viewed from an inside of a vehicle compartment. As a result, there is a disadvantage that an appearance of the light shielding sheet 11 as viewed from a passenger inside the vehicle compartment is degraded.

Figure 5B:
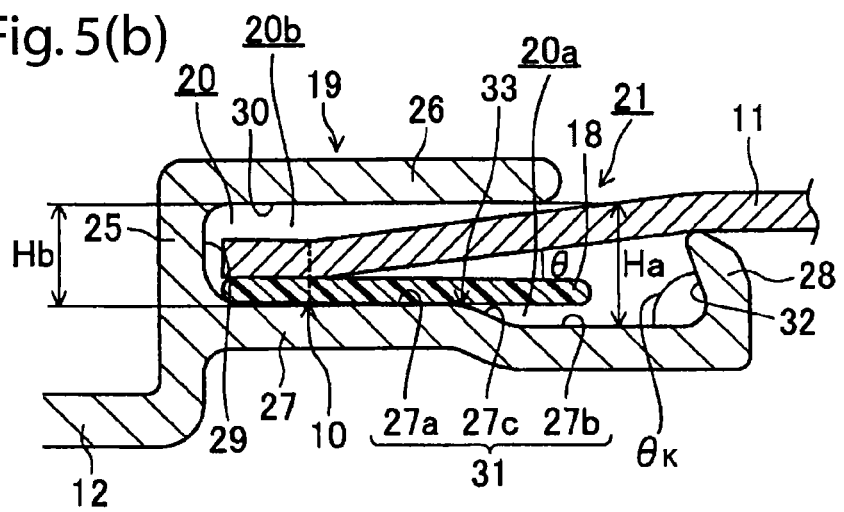

On the other hand, in the present embodiment, part (outer horizontal surface 27a) of the upper surface of the lower wall part 27 of the guide part 19 (i.e., a lower surface in the guide space 20) on the outer side in the sheet width direction is, as described above, formed at a position one step higher than that of part (inner horizontal surface 27b) of the upper surface of the lower wall part 27 on the inner side in the sheet width direction. Thus, even if the distance between the guide belt 18 and the inclined surface part 32 is large as illustrated in FIG. 5(b), the end part of the light shielding sheet 11 in the width direction thereof is supported as high as possible by the outer horizontal surface 27a. This can reduce or prevent weighing-down of the light shielding sheet 11. Consequently, there is no disadvantage that the appearance is degraded.

Moreover, in the present embodiment, the guide space 20 is formed such that the vertical length is smaller in part of the guide space 20 on the outer side in the sheet width direction than in part of the guide space 20 on the inner side in the sheet width direction.

Thus, in the state in which the inner end part of the guide belt 18 in the sheet width direction is apart from the inclined surface part 32, the end part of the light shielding sheet 11 in the width direction thereof and the guide belt 18 can be, instead of guiding the guide belt 18 by the inclined surface part 32, guided without vertical fluttering in the outer guide space 20b having a smaller vertical length. Consequently, stable opening/closing with the light shielding sheet 11 can be realized, and wrinkling of the light shielding sheet 11 or winding failure of the light shielding sheet 11 can be reduced or prevented.

The vertical length is greater in part of the guide space 20 on the inner side in the sheet width direction than in part of the guide space 20 on the outer side in the sheet width direction. Thus, in the state (see the state illustrated in FIGS. 4(b) and 4(c)) in which the inner end part of the guide belt 18 in the sheet width direction contacts the inclined surface part 32, the inclination angle θ of the guide belt 18 is large, and therefore the sufficient height h at which the guide belt 18 is caught by the inclined surface part 32 can be ensured. As a result, it can be ensured that the guide belt 18 is prevented from protruding out of the guide space 20 through the insertion hole 21.

The configuration of the present disclosure is not limited to the foregoing embodiment, and may have various configurations other than the foregoing configuration. That is, in the foregoing embodiment, the roller shade 1 is the electric roller shade configured to open/close the window 5 with the light shielding sheet 11 by the electric motor. However, the present disclosure is not limited to such a roller shade, and the roller shade 1 may be a roller shade configured to manually open/close a window with a light shielding sheet as in Japanese Patent Publication No. 2001-180279.

In the foregoing embodiment, the guide belt 18 is connected to the lower surface of the light shielding sheet 11 by sewing. However, the present disclosure is not limited to such a configuration, and the guide belt 18 may be connected to the lower surface of the light shielding sheet 11 by, e.g., bonding or welding.

In the present embodiment, the entirety of an outer side surface of the protruding wall part 28 in the sheet width direction defines the inclined surface part 32. However, the inclined surface part 32 may be formed only in the upper end part of the protruding wall part 28, for example.

In the foregoing embodiment, the traveling direction (i.e., a direction in which the guide frame 12 extends) of the light shielding sheet 11 is the front-back direction of the vehicle. However, the present disclosure is not limited to such a configuration, and the traveling direction of the light shielding sheet 11 may be, e.g., the vehicle width direction.

The present disclosure is useful for the roller shade, and particularly for the electrical roller shade.

The invention claimed is:

1. A roller shade, comprising:
a light shielding sheet which can be rolled up in a roll shape or can be unrolled and which covers a window formed in a roof of a vehicle so as to open or close the window;
rolling means configured to move the light shielding sheet in an opening direction of the window by rolling up the light shielding sheet and move the light shielding sheet in a closing direction of the window by unrolling the light shielding sheet;
a pair of strip-shaped guide belts each extending along a corresponding one of side end parts of the light shielding sheet in a sheet width direction perpendicular to a traveling direction of the light shielding sheet and each connected to a lower surface of the light shielding sheet; and
a pair of guide parts each having a guide space which receives a corresponding one of the side end parts of the light shielding sheet in the sheet width direction and a corresponding one of the guide belts, for guiding the side end part and the guide belt in the traveling direction, wherein
each guide belt tilts downward from a base end which is a connection part of the guide belt with the light shielding sheet, toward an inner side in the sheet width direction, and is vertically flexible about the connection part as a point of support, and
an inner wall surface of the guide space includes an inclined surface part which is located near the guide belt and closer to the inner side in the sheet width direction than the guide belt, and which extends upward to tilt to an outer side in the sheet width direction, and
wherein a vertical length of the guide space on the outer side in the sheet width direction is shorter than a vertical length of the guide space on the inner side in the sheet width direction.

2. The roller shade of claim 1, wherein
when the light shielding sheet moves, in a direction in which each guide belt is apart from the inclined surface part, in a state in which the each guide belt downwardly warps about the point of support which is the connection part due to contact between an inner end part of the each guide belt in the sheet width direction and the inclined surface part, the inner end part of the each guide belt in the sheet width direction upwardly slides along the inclined surface part in an inclination direction thereof while an inclination angle of the each guide belt with respect to the light shielding sheet is decreased by restoring force of the each guide belt which warps, thereby providing tension in the sheet width direction to the light shielding sheet.

3. The roller shade of claim 1, wherein
a part of a lower surface of the guide space on the outer side in the sheet width direction is positioned higher than a part of the lower surface of the guide space on the inner side in the sheet width direction.

\* \* \* \* \*